(12) United States Patent
Uranaka et al.

(10) Patent No.: US 8,400,730 B2
(45) Date of Patent: Mar. 19, 2013

(54) MULTISTAGE GASKET

(75) Inventors: Masaki Uranaka, Kanagawa (JP);
Tatsuro Namiki, Kanagawa (JP)

(73) Assignee: Bridgestone Corporation, Tokyo (JP)

( * ) Notice: Subject to any disclaimer, the term of this patent is extended or adjusted under 35 U.S.C. 154(b) by 400 days.

(21) Appl. No.: 12/674,585

(22) PCT Filed: Aug. 14, 2008

(86) PCT No.: PCT/JP2008/064589
§ 371 (c)(1),
(2), (4) Date: Apr. 21, 2010

(87) PCT Pub. No.: WO2009/028335
PCT Pub. Date: Mar. 5, 2009

(65) Prior Publication Data
US 2011/0038077 A1   Feb. 17, 2011

(30) Foreign Application Priority Data
Aug. 24, 2007 (JP) .................................. 2007-218978

(51) Int. Cl.
*G11B 33/14* (2006.01)
*F16J 15/10* (2006.01)
(52) U.S. Cl. .................... 360/99.22; 277/654; 277/936; 277/944
(58) Field of Classification Search ............... 360/97.12, 360/99.15, 99.16, 99.18, 99.22; 277/590, 277/628, 650, 654, 936, 944
See application file for complete search history.

(56) References Cited

U.S. PATENT DOCUMENTS

| | | | | |
|---|---|---|---|---|
| 4,950,521 A * | 8/1990 | Takamura et al. | ............... | 428/78 |
| 6,769,699 B2 * | 8/2004 | Seki et al. | ...................... | 277/628 |
| 6,889,984 B2 * | 5/2005 | Hatanaka | ...................... | 277/650 |
| 7,389,992 B2 * | 6/2008 | Isono | ............................. | 277/637 |
| 7,959,161 B2 * | 6/2011 | Seki et al. | ...................... | 277/648 |
| 2004/0075224 A1 * | 4/2004 | Kuroki et al. | .................. | 277/650 |
| 2005/0206093 A1 * | 9/2005 | Utsunomiya et al. | ......... | 277/628 |

FOREIGN PATENT DOCUMENTS

| | | |
|---|---|---|
| JP | 2002-228001 A | 8/2002 |
| JP | 2003-120819 A | 4/2003 |
| JP | 2003-171651 A | 6/2003 |
| JP | 2004-323833 A | 11/2004 |
| WO | 2007/091685 A1 | 8/2007 |

* cited by examiner

*Primary Examiner* — Will J Klimowicz
(74) *Attorney, Agent, or Firm* — Sughrue Mion, PLLC

(57) ABSTRACT

A multi-stage gasket having a multi-stage structure constituted by multiple kinds of gasket materials and being used by holding between a cover plate and a base plate, the multi-stage gasket having contactness of a gasket as the lowermost layer to the cover plate or the base plate in contact with the gasket that is higher than contactness of a gasket as the uppermost layer to the cover plate or the base plate in contact with the gasket. A gasket can be provided that provides good reworkability of a cover plate and a base plate of a hard disk device, provides sufficient adhesiveness of the gasket to a cover plate and a base plate even when used in a high humidity and temperature environment, and is prevented from being toppled sideways or peeled off even when applied with a force in an oblique direction.

18 Claims, 4 Drawing Sheets

MULTISTAGE GASKET

TECHNICAL FIELD

The present invention relates to a multi-stage gasket, and more specifically relates to a multi-stage gasket that is improved in reworkability of a cover plate and a base plate in a hard disk device.

BACKGROUND ART

In recent years, with progress of a hard disk device (which is hereinafter referred to as "HDD" in some cases) of a computer having high performance and reduced size, a 2.5-inch (63.5 mm) HDD is becoming mainstream, and furthermore, a small-sized HDD, such as 1.8 inch (45.7 mm) or 1 inch (25.4 mm), is becoming available as commercial products. The small-sized HDD has a complicated circuit structure and suffers failure with only a little dust, and therefore, dust is generally prevented from invading by using a gasket. A HDD gasket used for the small-sized HDD necessarily has a narrower line width and a large height, i.e., a gasket having a wall-like shape.

There are increasing cases where a HDD is used in a portable electronic equipment associated with the aforementioned reduction in size, and a HDD is often used in a severe environment as compared to conventional purposes, such as PC, and thus is necessarily assumed to be used in a high humidity and temperature environment.

Furthermore, associated with reduction in size of a hard disk device, there are cases where the top and bottom portions thereof, which are to be sealed with a gasket, are not in parallel to each other, and in these cases, the gasket receives a force in an oblique direction, whereby the gasket is toppled sideways or peeled off in some cases. Even though the top and bottom of the seal are in parallel to each other, the gasket may receive a force in an oblique direction upon screwing, which brings about the cases where the gasket is toppled sideways or peeled off. In particular, a gasket with a shape having a narrower line width and a large height for a small-seized hard disk device suffers the phenomenon conspicuously.

A gasket having a multi-stage shape is proposed for providing a gasket that satisfies the aforementioned required properties (see, for example, Patent Document 1). Specifically, the document discloses a gasket having a multi-stage shape formed by molding a gasket material containing an ultraviolet ray-curable elastomer with a dispenser, which exhibits excellent sealability for a prolonged period of time owing to the multi-stage cross sectional shape thereof. For preventing the gasket from being toppled sideways or peeled off with maintaining the sealability thereof under the high humidity and temperature environment, it is necessary to increase the adhesiveness to a cover plate and a base plate for protecting a HDD, which are described in detail later.

A HDD is protected with a protective member 1 containing a cover plate 11 and a base plate 12 as shown in FIG. 1. More specifically, the HDD is disposed on the base plate 12 and sealed with a gasket 13 holding with the cover plate 11 and the base plate 12.

The production yield of HDD is currently around 50%, and parts of a rejected product are necessarily regulated by the parts thereof after detaching the cover plate 11 from the base plate 12 as shown in FIG. 2 or FIG. 3. There are the case where the gasket is formed and adhered to the cover plate as shown in FIG. 2 and the case where it is formed and adhered to the base plate as shown in FIG. 3, and in either case, the gasket is stuck to the other plate to accomplish sealing. In the case where the cover plate 11 is detached from the base plate 12 upon regulating the parts of the HDD, it is desired that the stuck part is clearly peeled off with no gasket remaining, and the adhered part maintains the gasket staying.

However, the gasket having a multi-stage shape, which is firmly adhered to the cover plate and the base plate for maintaining the sealability of the gasket, is poor in reworkability and thus is problematic on regulating the HDD. The use of a material having a low adhering force in consideration of reworkability, on the other hand, results in insufficient sealability.

The term adhesion referred herein means that a gasket is firmly in contact closely with an adherend with chemical bond or the like through ultraviolet ray curing or the like, and the term sticking means that a gasket is physically in contact with an adherend with tackiness, heat, compression or the like of the gasket.

[Patent Document 1] JP-A-2003-120819

DISCLOSURE OF THE INVENTION

Under the circumstances, an object of the present invention is to provide a gasket that provides good reworkability of a cover plate and a base plate of a hard disk device, provides sufficient adhesiveness of the gasket to a cover plate and a base plate even when used in a high humidity and temperature environment, and is prevented from being toppled sideways or peeled off even when applied with a force in an oblique direction.

The inventors have made earnest investigations for achieving the object and have noted that it is important for improving reworkability of a cover plate and a base plate of a hard disk device that in the case where a gasket intervening between the cover plate and the base plate is adhered to the cover plate, the adhesiveness to the cover plate is increased whereas the stickiness to the base plate is lowered in such a range that the sealability is not impaired, and in the case where the gasket is adhered to the base plate, the adhesiveness to the base plate is increased whereas the stickiness to the cover plate is lowered in such a range that the sealability is not impaired.

Based on the knowledge, the inventors have found that the problems can be solved by using, in a gasket having a multi-stage structure with high sealability, multiple kinds of materials in gaskets constituting the stages. The present invention has been completed based on the findings.

The present invention includes the following aspects.

(1) A multi-stage gasket having a multi-stage structure constituted by multiple kinds of gasket materials and being used by holding between a cover plate and a base plate, the multi-stage gasket having contactness of a gasket as the lowermost layer to the cover plate or the base plate in contact with the gasket that is higher than contactness of a gasket as the uppermost layer to the cover plate or the base plate in contact with the gasket, (2) the multi-stage gasket according to the item (1), wherein the contactness of the gasket as the lowermost layer to the cover plate or the base plate is twice or more the contactness of the gasket as the uppermost layer to the cover plate or the base plate, (3) the multi-stage gasket according to the item (1) or (2), wherein the gasket as the lowermost layer is in contact closely to the cover plate, and the gasket as the uppermost layer is in contact closely to the base plate, (4) the multi-stage gasket according to the item (3), wherein the materials constituting the gaskets for stages constituting the multi-stage structure each contain a common base polymer, (5) the multi-stage gasket according to the item (4), wherein the common base polymer is (A) an energy ray-curable liquid urethane oligomer having a polymerizable unsaturated group, (6) the multi-stage gasket according to the item (5), wherein the energy ray-curable liquid urethane oligomer having a polymerizable unsaturated group (A) is an unsaturated group-containing urethane oligomer having a number average molecular weight of from $5 \times 10^3$ to $5 \times 10^4$ represented by the following general formula (I):

$$R^1—O—CONH—R^2—NHCO)—(—O—R^3—O—CONH—R^2—NHCO)_p—(-A^1-CONH—R^2—NHCO—)_q—(—O—R^3—O—CONH—R^2—NHCO—)_r—O—R^1 \quad (I)$$

wherein $R^1$ represents a dehydroxylated residual group of a monool compound containing at least one unsaturated group selected from a (meth)acryloyl group and a vinyl group; $R^2$ represents a deisocyanated residual group of an organic diisocyanate compound; $R^3$ represents a dehydroxylated residual group of a polyesterdiol compound having a number average molecular weight of from $1 \times 10^3$ to $1 \times 10^4$ containing a cyclic group or a branched chain group; $A^1$ represents a dehydrogenated residual group of a diamine compound or a dehydrogenated residual group of a diol compound; p and r each is from 0 to 7, and q is from 0 to 3, provided that when q=0, $1 \leq p+r \leq 10$, (6) the multi-stage gasket according to the item (6), wherein the material for forming the gasket as the lowermost layer contains (B) a (meth)acrylic monomer having a nitrogen-containing heterocyclic structure represented by the following general formula (II):

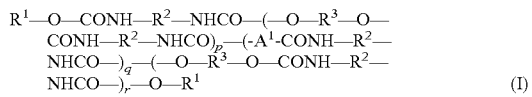

(II)

wherein $R^4$ represents a hydrogen atom or a methyl group; and $R^5$ represents a group having a nitrogen-containing heterocyclic structure, and the material for forming the gasket as the uppermost layer contains (C) a monofunctional (meth)acrylic monomer, a cured product of which has a glass transition temperature (Tg) of from −70 to 20° C., (8) the multi-stage gasket according to the item (7), wherein the monofunctional (meth)acrylic monomer, a cured product of which has a glass transition temperature (Tg) of from −70 to 20° C. (C) is a (meth)acrylate ester compound represented by the following general formula (III):

(III)

wherein $R^6$ represents a hydrogen atom or a methyl group; and $R^7$ represents an alkyl group having from 8 to 20 carbon atoms, (9) the multi-stage gasket according to the item (7), wherein the monofunctional (meth)acrylic monomer, a cured product of which has a glass transition temperature (Tg) of from −70 to 20° C., (C) is a (meth)acrylate ester compound represented by the following general formula (IV):

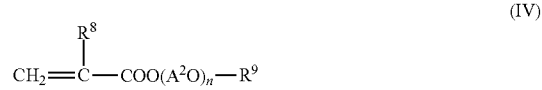

(IV)

wherein $A^2$ represents an alkylene group having from 2 to 4 carbon atoms; $R^8$ represents a hydrogen atom or a methyl group; $R^9$ represents an alkyl group having from 6 to 20 carbon atoms, an aralkyl group having from 7 to 20 carbon atoms or an aryl group having from 6 to 20 carbon atoms; and p represents a number of from 1 to 7 in average,

(10) the multi-stage gasket according to one of the items (1) to (9), wherein the gaskets for stages having the multi-stage structure are in contact closely to each other through an adhesive,

(11) the multi-stage gasket according to one of the items (1) to (10), wherein the material for forming the gasket as the lowermost layer is extruded from an extrusion orifice of an automatic coating controlling apparatus to form the gasket as the lowermost layer, then the material for forming the gasket as the uppermost layer is extruded onto the gasket as the lowermost layer, and then they are cured by irradiating with an ionizing radiation,

(12) the multi-stage gasket according to the item (11), wherein the material for forming the gasket as the lowermost layer is extruded from an extrusion orifice of an automatic coating controlling apparatus and is then semi-cured, and

(13) the multi-stage gasket according to one of the items (1) to (12), which is for a hard disk device.

According to the present invention, such a gasket can be provided that provides good reworkability of a cover plate and a base plate of a hard disk device, provides sufficient adhesiveness of the gasket to a cover plate and a base plate even when used in a high humidity and temperature environment, and is prevented from being toppled sideways or peeled off even when applied with a force in an oblique direction.

EXPLANATION OF SYMBOLS 1 protective member
11 cover plate
12 base plate
13 gasket

BEST MODE FOR CARRYING OUT THE INVENTION

The gasket of the present invention has a multi-stage structure constituted by multiple kinds of gasket materials as a characteristic feature. The multi-stage structure of the gasket provides a gasket having a narrow line width and a large height. The multi-stage structure herein includes a two-stage structure and a three-stage or more structure.

Figure 1:
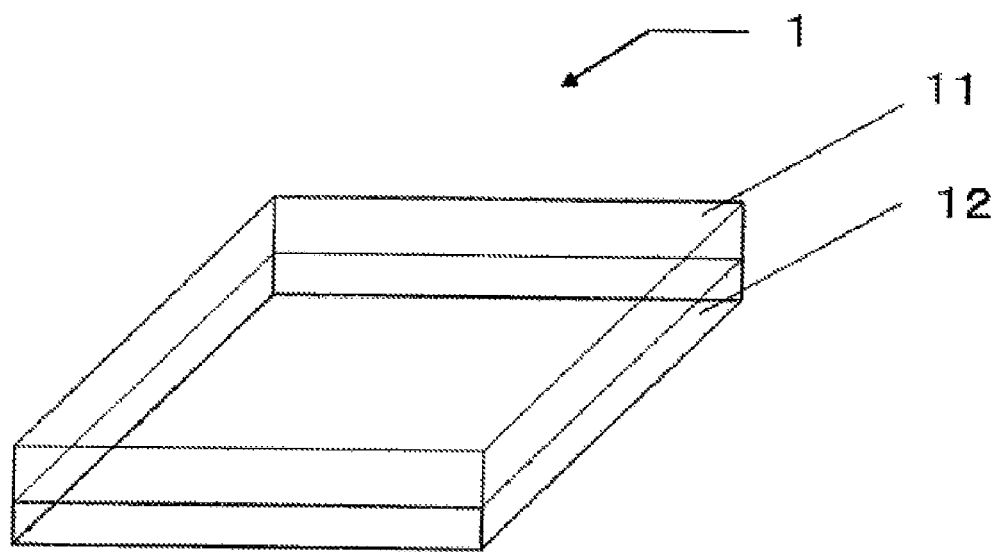
FIG. 1 is a conceptual view showing a protective member protecting a HDD.
Figure 2:
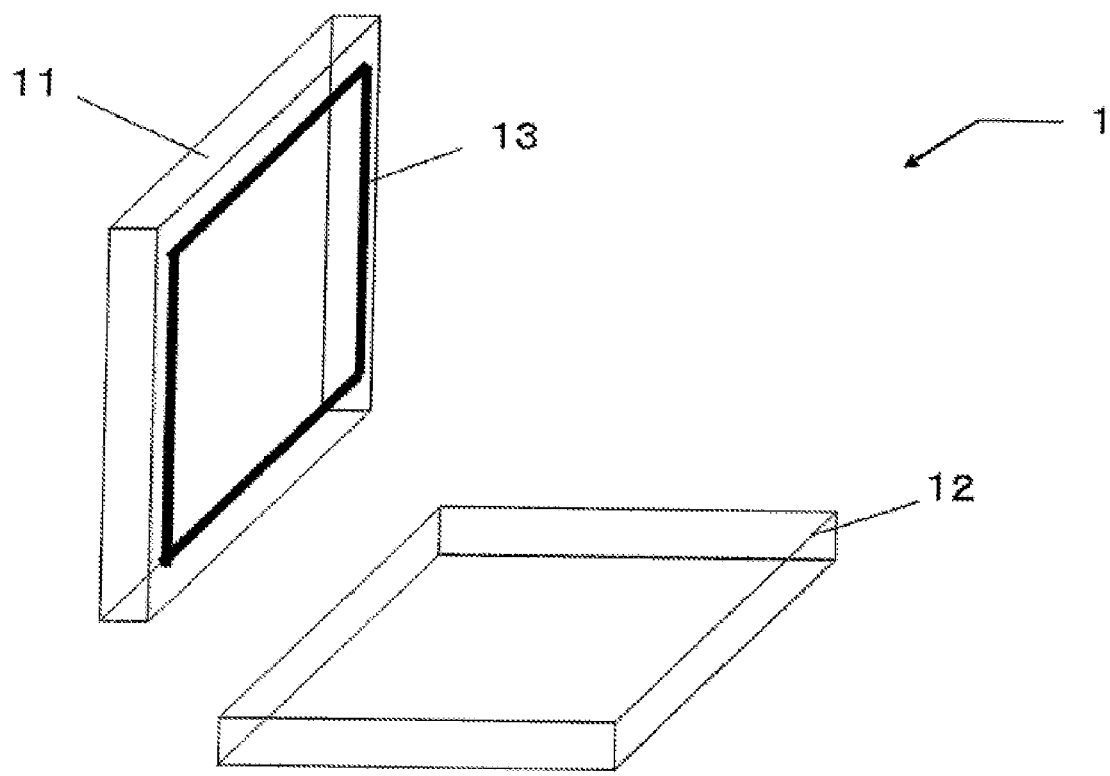
FIG. 2 is a diagram showing a cover plate being detached from a base plate of a protective member protecting a HDD in the case where a gasket is adhered to the cover plate.
Figure 3:
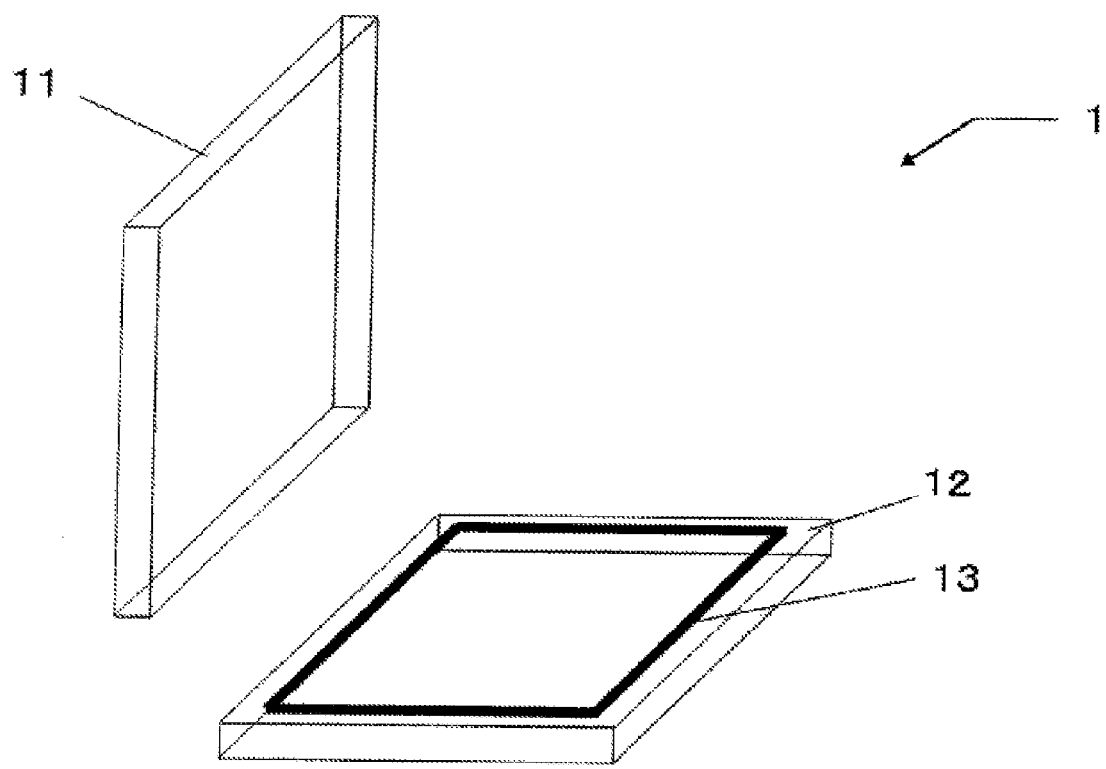
FIG. 3 is a diagram showing a cover plate being detached from a base plate of a protective member protecting a HDD in the case where a gasket is adhered to the base plate.
Figure 4:
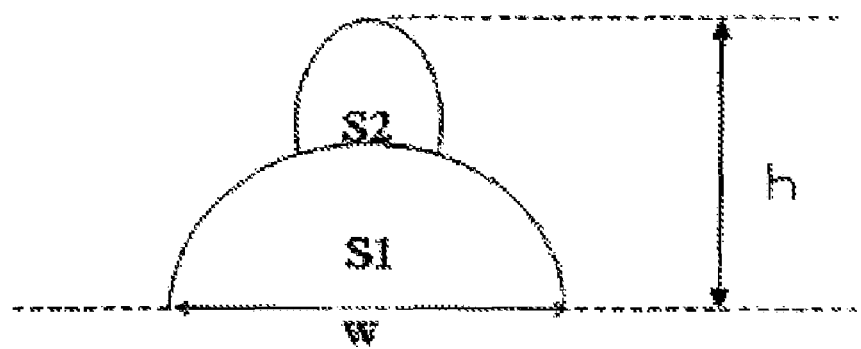
FIG. 4 is a conceptual view showing a multi-stage gasket of the present invention.

In the present invention, multiple kinds of materials are used as the gasket materials constituting the multi-stage structure, and at least the gasket as the lowermost layer and the gasket as the uppermost layer are constituted by multiple kinds of materials. For example, in the case of a two-stage structure shown in FIG. 4, the materials for the first stage (S1) gasket and the second stage (S2) gasket are necessarily of multiple kinds, and in the case of a three-stage structure shown in FIG. 5, at least the materials for the first stage (S1) gasket and the third stage (S3) gasket are necessarily of multiple kinds. Taking the reworkability of the gasket into consideration, a material having high contactness to a cover plate or a base plate is selected for the gasket as the lowermost layer, a material having low contactness to a cover plate or a base plate in such a range that the sealability is not impaired is selected for the gasket as the uppermost layer.

More specifically, in the case where a gasket is formed on a cover plate, i.e., a gasket as the lowermost layer is adhered to a cover plate, the gasket as the lowermost layer is firmly adhered to the cover plate, and a gasket as the uppermost layer is made in contact with a base plate with low contactness. In the case where a gasket is formed on a base plate, on the other hand, the gasket as the lowermost layer is firmly adhered to the base plate, and a gasket as the uppermost layer is made in contact with a cover plate with low contactness.

In the present invention, the gasket may be formed on either a cover plate or a base plate, and from the standpoint of facility of production and productivity, particularly in a HDD or the like, the gasket is formed preferably on a cover plate since the main body is disposed on a base plate. Accordingly, such an embodiment is more preferred that a gasket as the lowermost layer is firmly adhered to the cover plate, and a gasket as the uppermost layer is made in contact with a base plate with low contactness. In the following description, the case where the gasket is formed on a cover plate as a more preferred embodiment is described as an example.

Figure 5:
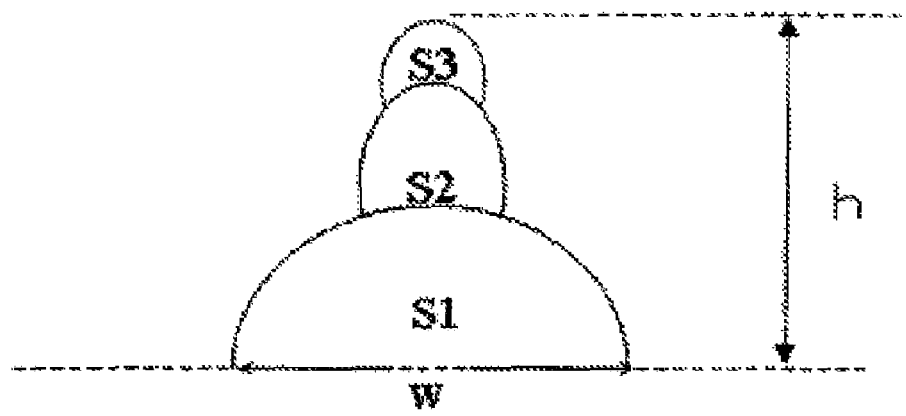
FIG. 5 is a conceptual view showing a multi-stage gasket of the present invention.

A material for a gasket present between the gasket as the lowermost layer and the gasket as the uppermost layer, i.e., the gasket S2 in the three-stage structure shown in FIG. 5, is not particularly limited as far as it has a capability as a gasket and has high stickiness to the gaskets as the upper layer and the lower layer.

In the multi-stage gasket of the present invention, the ratio (h/w) of the height (h) of the gasket and the line width (w) of the adhering surface of the gasket to the cover plate is preferably from 0.8 to 3.0 in a portion of 80% or more of the gasket. When the ratio is 0.8 or more, the gasket can be used in a small-sized HDD with sufficient sealability obtained. When the ratio is 3.0 or less, the gasket is hard to be toppled sideways upon compressing, thereby providing no problem in sealability.

The height of the gasket of the first stage (lowermost layer) is preferably 0.5 or more with respect to the total height of the multi-stage gasket. This provides a stable structure of the multi-stage gasket, which is hard to be toppled sideways or peeled off, for example, when applied with a force in an oblique direction.

Upon selecting the materials for forming the gaskets, more specifically, it is necessary that the contactness of the gasket as the lowermost layer to the cover plate is higher than the contactness of the gasket as the uppermost layer to the base plate. Furthermore, it is preferred that the contactness of the gasket as the lowermost layer to the cover plate is twice or more the contactness of the gasket as the uppermost layer to the base plate. When the difference in contactness is twice or more, the gasket is firmly adhered to the cover plate, and the contactness to the base plate is sufficiently low, thereby ensuring reworkability. In view of the aforementioned point, it is more preferred that the contactness of the gasket as the lowermost layer to the cover plate is 10 times or more the contactness of the gasket as the uppermost layer to the base plate. The contactness herein can be evaluated with a value obtained by measuring the force required for detaching the base cover with a tensile tester (Tensilon).

As described above, the materials for forming the gaskets are necessarily selected for controlling the adhesiveness or the contactness of the gaskets as the lowermost layer and the uppermost layer to the cover plate or the base plate, and also are necessarily such materials that has capability as a gasket, i.e., capability including resistance to moisture permeation and resistance to gas permeation. Various kinds of materials are included in the materials having the capability, and for example, urethane, an epoxy polymer, silicone, polyisoprene, hydrogenated polyisoprene, polybutadiene, hydrogenated polybutadiene, polyisobutyrene, fluorine-containing rubber, and modified products thereof may be used as a major component. These materials may be used solely or as a combination of two or more kinds of them.

The materials for forming the gaskets of the stages constituting the multi-stage structure each preferably contain a common base polymer. The use of a common base polymer enhances the contactness between the gaskets of the stages, and also is advantageous from the standpoint of productivity and production cost in the production process of the gasket.

The common base polymer is particularly preferably (A) an energy ray-curable liquid urethane oligomer having a polymerizable unsaturated group. The component (A) will be described below.

(A) Energy Ray-Curable Liquid Urethane Oligomer

The energy ray-curable liquid urethane oligomer used as the component (A) in the materials for forming the gasket of the present invention designates a liquid urethane oligomer that is crosslinked by irradiation of a ray having an energy quantum among electromagnetic waves and charged corpuscular rays, e.g., an ultraviolet ray, an α-ray, a β-ray, a γ-ray and an electron beam.

Examples of the energy ray-curable liquid urethane oligomer as the component (A) include an unsaturated group-containing urethane oligomer having a number average molecular weight of from $5\times10^3$ to $5\times10^4$ represented by the following general formula (I):

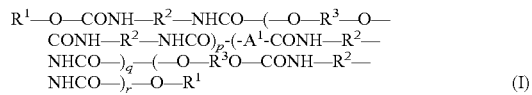
(I)

In the general formula (I), $R^1$ represents a dehydroxylated residual group of a monool compound containing at least one unsaturated group selected from a (meth)acryloyl group and a vinyl group.

Preferred examples of the monool compound include a hydroxyalkyl(meth)acrylate and a hydroxyalkylvinyl, and examples thereof include diethylene glycol mono(meth)acrylate, dipropylene glycol mono(meth)acrylate, tripropylene glycol mono(meth)acrylate, triethylene glycol mono(meth)acrylate and polyethylene glycol mono(meth)acrylate. The (meth)acryloyl group means an acryloyl group or a methacryloyl group.

$R^2$ represents a deisocyanated residual group of an organic diisocyanate compound. For example, an alkylene group, such as a methylene group, an ethylene group, a propylene group, a butylene group and a hexamethylene group, a cycloalkylene group, such as a cyclohexylene group, an arylene group, such as a phenylene group, a tolylene group and a naphthylene group, a xylylene group and the like are contained. The alkyl group herein may be linear, branched or cyclic. Preferred examples of the organic diisocyanate compound include isophorone diisocyanate, hexamethylene diisocyanate, norbornane diisocyanate, tolylene diisocyanate, xylylene diisocyanate, trimethylhexamethylene diisocyanate, naphthalene diisocyanate, hydrogenated xylylene diisocyanate, hydrogenated diphenylmethane diisocyanate and diphenylmethane diisocyanate.

$R^3$ represents a dehydroxylated residual group of a polyesterdiol compound having a number average molecular weight of from $1 \times 10^3$ to $1 \times 10^4$ containing a cyclic group or a branched chain group.

In the compound, $R^3$ preferably represents a dehydroxylated residual group of the polyesterdiol compound formed by condensing a cyclic group-containing dicarboxylic acid and a diol or a dehydroxylated residual group of a polyesterdiol compound formed by modifying a cyclic group-containing dicarboxylic anhydride through reaction with a diol.

Examples of the cyclic group-containing dicarboxylic acid or an acid anhydride thereof constituting $R^3$ include phthalic acid, phthalic anhydride, pyromellitic acid, pyromellitic anhydride, isophthalic acid, trimellitic acid, trimellitic anhydride, tetrahydrophthalic acid, tetrahydrophthalic anhydride, hexahydrophthalic acid and hexahydrophthalic anhydride. These may be used as a mixture of plural kinds of them.

Examples of the diol constituting $R^3$ include ethylene glycol, propylene glycol, 2,2,4-trimethyl-1,3-pentanediol, neopentyl glycol, 1,2-propanediol, 1,3-propanediol, 1,4-propanediol, 1,3-butanediol, 1,5-pentanediol, 1,6-hexanediol, 2,2-dimethyl-1,3-propanediol, bisphenol A, 2,2-thiodiethanol, an acetylene type diol, hydroxyl-terminated polybutadiene, 1,4-cyclohexanedimethanol, 1,2-cyclohexanedimethanol, 1,3-cyclohexanedimethanol, 1,4-bis(2-hydroxyethoxy)cyclohexane, trimethylene glycol, tetramethylene glycol, pentamethylene glycol, hexamethylene glycol, decamethylene glycol, diethylene glycol, triethylene glycol, tetraethylene glycol, norbornylene glycol, 1,4-benzenedimethanol, 1,4-benzenediethanol, 2,4-dimethyl-2-ethylenehexane-1,3-diol, 2-butene-1,4-diol, 2,4-diethyl-1,5-pentanediol, 2-ethyl-2-butyl-1,3-propanediol and 3-methyl-1,5-pentanediol.

In the general formula (I), $A^1$ represents a dehydrogenated residual group of a diamine compound or a dehydrogenated residual group of a diol compound.

The dehydrogenated residual groups are not particularly limited, and preferred examples thereof include dehydrogenated residual groups of diamine compounds selected from diaminopropane, diaminobutane, nonanediamine, isophoronediamine, hexamethylenediamine, hydrogenated diphenylmethanediamine, bisaminopropyl ether, bisaminopropylethane, bisaminopropyldiethylene glycol ether, bisaminopropylpolyethylene glycol ether, bisaminopropoxyneopentyl glycol, diphenylmethanediamine, xylylenediamine, tolyelenediamine and both-ends amino group-modified silicone, and dehydrogenated residual groups of diol compounds selected from ethylene glycol, propylene glycol, polyethylene glycol, polypropylene glycol, butylene glycol, polytetramethylene glycol, pentanediol, hexanedionl, both-ends hydroxyl group-modified silicone and a carboxyl group-containing diol.

$R^1$ preferably represents a dehydroxylated residual group of a monool compound selected from a hydroxyalkyl(meth)acrylate and a hydroxyalkyl vinyl ether, and examples thereof include dehydroxylated residual groups of hydroxyethyl acrylate and hydroxymethyl vinyl ether.

The energy ray-curable liquid urethane oligomer as the component (A) can be produced preferably by the following manner.

The unsaturated group-containing urethane oligomer represented by the general formula (I), wherein q=0, can be obtained in such a manner that the polyesterdiol compound and the organic diisocyanate compound are subjected to polyaddition reaction to form an adduct having isocyanate groups at both ends thereof, and then the monool compound is added to the isocyanate groups.

The unsaturated group-containing urethane oligomer represented by the general formula (I), wherein q≠0, can be obtained in such a manner that the polyesterdiol compound and the organic diisocyanate compound are subjected to polyaddition reaction to form an adduct having isocyanate groups at both ends thereof, then one end of the diamine compound or the diol compound is added to the isocyanate group at one end of the adduct, and the monool compound is added to the isocyanate group at the other end thereof.

The energy ray-curable liquid urethane oligomer has a function of imparting appropriate rubber elasticity to the gasket upon producing the gasket by curing the gasket forming material of the present invention through irradiation of an energy ray, thereby enhancing the sealability of the gasket. In view of the function, moldability and the like, the number average molecular weight of the energy ray-curable liquid urethane oligomer is preferably approximately from $5 \times 10^3$ to $5 \times 10^4$ in general while it depends on the structure thereof.

In the present invention, one kind of the energy ray-curable liquid urethane oligomer having a polymerizable unsaturated group may be used as the component (A), and two or more kinds thereof may be used therefor in combination.

The material for forming the gasket as the lowermost layer in the present invention preferably contains, in addition to the component (A), (B) a (meth)acrylic monomer having a nitrogen-containing heterocyclic structure represented by the following general formula (II):

(II)

wherein $R^4$ represents a hydrogen atom or a methyl group; and $R^5$ represents a group having a nitrogen-containing heterocyclic structure. The use of the component (B) contained increases the contactness between the cover plate and the gasket, enhances the capability of the gasket, and provides good moldability. The component (B) will be described below.

(B) (Meth)acrylic Monomer Having Nitrogen-containing Heterocyclic Structure

In the general formula (II), $R^4$ represents a hydrogen atom or a methyl group, and $R^5$ represents a group having a nitrogen-containing heterocyclic structure. The group having a nitrogen-containing heterocyclic structure is not particularly limited and is preferably selected in such a manner that a cured product of the (meth)acrylic monomer has a glass transition temperature (Tg) within the range described later. Examples of the group include a morpholino group and a hexahydrophthalimide-N-ylethyloxy group.

A cured product of the (meth)acrylic monomer having a nitrogen-containing heterocyclic structure as the component (B) preferably has a glass transition temperature in a range of from 50 to 150° C., and more preferably in a range of from 100 to 150° C., from the standpoint for providing a gasket having good reworkability with the cover plate and the base plate and good capability and moldability as a gasket.

The glass transition temperature (Tg) of the (meth)acrylic monomer is a value obtained by measuring a polymer obtained by polymerizing the monomer in an ordinary radical polymerization method with a differential scanning calorimeter (DSC) under ordinary conditions.

The (meth)acrylic monomer having a nitrogen-containing heterocyclic structure as the component (B) preferably has a glass transition temperature (Tg) of a cured product thereof within the aforementioned range, and for example, N-(acryloyl)morpholine represented by the following formula (II-a) (Tg: 145° C.), N-(acryloyloxyethyl) hexahydrophthalimide represented by the following formula (II-b) (Tg: 56° C.), N-(acryloyloxyethyl)-1,2,3,6-tetrahydrophthalimide represented by the following general formula (II-c) (Tg: 47° C.) and N-(acryloyoxyethyl)-3,4,5,6-tetrahydrophthalimide represented by the following formula (II-d) (Tg: 33° C.) are preferably used.

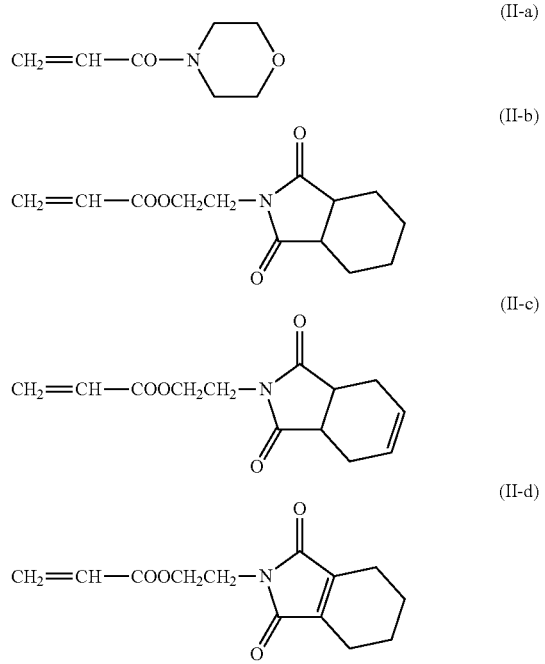

In the present invention, one kind of the (meth)acrylic monomer having a nitrogen-containing heterocyclic structure may be used as the component (B), and two or more kinds thereof may be used therefor in combination.

In the gasket forming material of the present invention, the content of the (meth)acrylic monomer having a nitrogen-containing heterocyclic structure as the component (B) is preferably from 5 to 40 parts by mass, and more preferably from 5 to 30 parts by mass, per 100 parts by mass of the energy ray-curable liquid urethane oligomer as the component (A) from the standpoint for providing a gasket having good reworkability with the cover plate and the base plate in the hard disk device and good capability and moldability as a gasket.

The material for forming the gasket as the uppermost layer in the present invention preferably contains, in addition to the component (A) described above, (C) a monofunctional (meth)acrylic monomer, a cured product of which has a glass transition temperature (Tg) of from −70 to 20° C. The use of the component (C) contained can reduce the compression surface pressure of the gasket at the portion in contact with the base plate, thereby reducing the contactness between the base plate and the gasket. It also enhances the capability as a gasket and provides good moldability. Accordingly, the use of the component (C) contained provides good reworkability of the gasket of the present invention with the sealability thereof maintained. The component (C) will be described below.

(C) Monofunctional (Meth)Acrylic Monomer

The component (C) in the materials for forming the gasket of the present invention is a monofunctional (meth)acrylic monomer, a cured product of which has a glass transition temperature (Tg) of from −70 to 20° C., and preferably from −70 to 0° C., (which may be hereinafter referred to as a low Tg monofunctional (meth)acrylic monomer).

The glass transition temperature (Tg) of the (meth)acrylic monomer is a value obtained by measuring a polymer obtained by polymerizing the monomer in an ordinary radical polymerization method with a differential scanning calorimeter (DSC) under ordinary conditions.

The low Tg monofunctional (meth)acrylic monomer may be appropriately selected, for example, from (meth)acrylate ester compounds represented by the following general formulae (III) and (IV) that have a Tg within the aforementioned range.

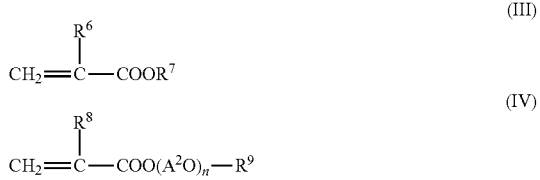

In the general formula (III), $R^6$ represents a hydrogen atom or a methyl group, and $R^7$ represents a linear or branched alkyl group having from 8 to 20 carbon atoms. Examples of the alkyl group represented by $R^7$ include various kinds of decyl groups, various kinds of dodecyl groups, various kinds of tetradecyl groups, various kinds of hexadecyl groups and various kinds of octadecyl groups.

In the general formula (IV), $A^2$ represents an alkylene group having from 2 to 4 carbon atoms. The alkylene group may be linear or branched. Examples thereof include an ethylene group, a propylene group, a trimethylene group, a tetramethylene group and a 1-methylpropylene group, and among these, an ethylene group and a propylene group are preferred, and an ethylene group is particularly preferred. $R^8$ represents a hydrogen atom or a methyl group, and $R^9$ represents an alkyl group having from 6 to 20 carbon atoms, an aralkyl group having from 7 to 20 carbon atoms or an aryl group having from 6 to 20 carbon atoms.

In $R^9$, the alkyl group having from 6 to 20 carbon atoms may be linear or branched, and examples thereof include various kinds of hexyl groups, various kinds of octyl groups, various kinds of decyl groups, various kinds of dodecyl groups, various kinds of tetradecyl groups, various kinds of hexadecyl groups and various kinds of octadecyl groups. The aralkyl group having from 7 to 20 carbon atoms may have a linear or branched alkyl group having from 1 to approximately 15 carbon atoms introduced onto the aromatic ring, and examples thereof include a benzyl group, an alkylbenzyl group, a phenethyl group, an alkylphenethyl group, a naphthylmethyl group and an alkylnaphthylmethyl group. The aryl group having from 6 to 20 carbon atoms may have a linear or branched alkyl group having from 1 to approximately 15 carbon atoms introduced onto the aromatic ring, and examples thereof include a phenyl group, an alkylphenyl group, a naphthyl group and an alkylnaphthyl group.

n represents a number of from 1 to 7 in average, and when n is increased, the monomer is hard to suffer oxygen inhibition upon curing, thereby resulting in small surface tackiness, but a tendency of decreasing the moisture permeability of the cured product occurs. n is preferably approximately from 1 to 4 in average from the standpoint of balance between tackiness and moisture permeability.

Preferred examples of the low Tg monofunctional (meth)acrylic monomer as the component (C) from the standpoint of reducing the compression surface pressure of the cured product include, as the (meth)acrylate ester compound represented by the general formula (III) described above, lauryl acrylate (Tg: −3° C.) and isomyristyl acrylate (Tg: −56° C.), and as the (meth)acrylate ester compound represented by the general formula (IV), the compounds represented by the following formula (IV-a) (Tg: 17° C.), formula (IV-b) (Tg: −20° C.), formula (IV-c) (Tg: −22° C.), formula (IV-d) (Tg: −25° C.) and formula (IV-e) (Tg: −18° C.).

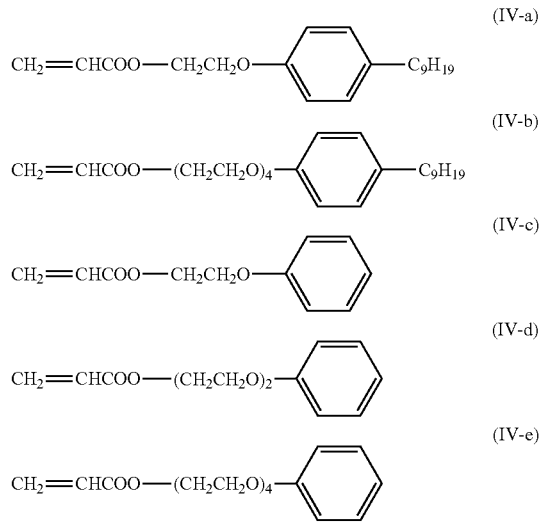

Among these, the compounds represented by the formulae (IV-a) and (IV-d) are particularly preferred from the standpoint of balance among compression surface pressure, tackiness and moisture permeability.

In the present invention, one kind of the low Tg monofunctional (meth)acrylic monomer may be used as the component (C), and two or more kinds thereof may be used therefore in combination.

In the gasket forming material of the present invention, the content of the low Tg monofunctional (meth)acrylic monomer as the component (C) is preferably from 5 to 40 parts by mass, and more preferably from 5 to 20 parts by mass, per 100 parts by mass of the energy ray-curable liquid urethane oligomer as the component (A) from the standpoint for providing a gasket having good reworkability with the cover plate and the base plate in the hard disk device and good capability and moldability as a gasket.

(D) Thixotropy Imparting Agent

The materials for forming the gasket of the present invention may further contain a thixotropy imparting agent as a component (D).

As a production method of the multi-stage gasket of the present invention, a dispensing method, in which a molten resin or a resin in a solution state is extruded with a dispenser in a gasket shape onto a cover plate and is integrated therewith, is industrially used widely owing to such advantages as unnecessity of an adhering step or the like. For enhancing accuracy of the gasket shape formed by extrusion, such a method is employed that the shear velocity dependency of the viscosity is controlled to be large, thereby using a material exhibiting high viscosity at a low shear velocity and low viscosity at a high shear velocity. A thixotropy imparting agent is used for controlling the shear velocity dependency of the viscosity in this manner.

The thixotropy imparting agent as the component (D) is preferably contained in an amount of from 0.5 to 10 parts by mass per 100 parts by mass of the energy ray-curable liquid urethane oligomer as the component (A). The combination use of the thixotropy imparting agent efficiently enhances the thixotropy, thereby enabling the process with the extruded shape controlled accurately. In view of this standpoint, the amount of the component (D) added is more preferably from 1 to 5 parts by mass.

As the thixotropy imparting agent, an inorganic filler and an organic thickening agent may be used.

Examples of the inorganic filler include surface-treated fine powder silica, such as wet-process silica and dry-process silica, and a natural mineral product, such as organized bentonite. Specific examples thereof include silica fine powder formed into fine powder by a dry method (for example, Aerosil 300, a trade name, produced by Nippon Aerosil Co., Ltd.), fine powder obtained by modifying the silica fine powder with trimethyldisilazane (for example, Aerosil RX300, a trade name, produced by Nippon Aerosil Co., Ltd.) and fine powder obtained by modifying the silica fine powder with polydimethylsiloxane (for example, Aerosil RY300, a trade name, produced by Nippon Aerosil Co., Ltd.). The average particle diameter of the inorganic filler is preferably from 5 to 50 μm, and more preferably from 5 to 12 μm, from the standpoint of thickening property.

Examples of the organic thickening agent include amide wax, hydrogenated castor oil and a mixture thereof. Specific examples thereof include hydrogenated castor oil, which is a hydrogenated product of castor oil (nondrying oil containing ricinoleic acid as a major component), (for example, ADVITROL 100, a trade name, produced by Süd-Chemie Catalysts Japan, Inc., and Disparlon 305, a trade name, produced by Kusumoto Chemicals, Ltd.), and higher amide wax, which is a compound obtained by substituting hydrogen of ammonia with an acyl group (for example, Disparlon 6500, a trade name, produced by Kusumoto Chemicals, Ltd.).

Among the thixotropy imparting agents, the organic thickening agent is preferred. The natural mineral inorganic filler unavoidably contains impurities, such as a heavy metal, and the surface-treated fine powder silica may be changed in viscosity of the composition due to change in surface wettability, and may form a gas that is harmful to the device upon use, depending on the kind of the surface-treating agent.

Among the organic thickening agents, hydrogenated castor oil is particularly preferred since amide wax may be increased in hardness due to increase of crosslinking density caused by the presence of amine derived from raw materials.

(E) Additional Components

The gasket forming materials of the present invention may further contain at least one of a photopolymerization initiator and a crosslinking agent as a component (E). The addition thereof is particularly preferred when curing is performed by irradiation of an ultraviolet ray.

The photopolymerization initiator may be either an intramolecular cleavage type or a hydrogen drawing type. Examples of the intramolecular cleavage type include a benzoin derivative compound, a benzylketal compound (for example, Irgacure 651, a trade name, produced by Ciba Speciality Chemicals, Inc.), an α-hydroxyacetophenone compound (for example, Darocure 1173 and Irgacure 184, trade names, produced by Ciba Speciality Chemicals, Inc.), an α-aminoacetophenone compound (for example, Irgacure 907 and Irgacure 369, trade names, produced by Ciba Speciality Chemicals, Inc.), combination use of an α-aminoacetophenone compound and a thioxanthone compound (for example, isopropylthioxanthone and diethylthioxanthone), and an acylphosphineoxide compound (for example, Irgacure 819, a trade name, produced by Ciba Speciality Chemicals, Inc.). Examples of the hydrogen drawing type include combination use of a benzophenone compound and amine, and combination use of thioxanthone and amine. The intramolecular cleavage type and the hydrogen drawing type may be used in combination. Among these, oligomerized α-hydroxyacetophenone and an acrylated benzophenone compound are preferred. More specific examples thereof include oligo(2-hydroxy-2-methyl-1-(4-(1-methylvinyl)phenyl)propanone) (for example, ESACURE KIP150, a trade name, produced by Lamberti SpA), acrylated benzophenone (for example, Ebecryl P136, a trade name, produced by Daicel UCB Co., Ltd.), and imide acrylate.

Examples of the crosslinking agent include an organic peroxide, and specific examples thereof include 2,5-dimethyl-2,5-di(t-butylperoxy)hexane, 2,5-dimethyl-2,5-di(benzoylperoxy)hexane, t-butyl peroxybenzoate, dicumyl peroxide, t-butylcumyl peroxide, diisopropyl benzohydroperoxide, 1,3-bis(t-butylperoxyisopropyl)benzene, benzoyl peroxide and 1,1-di(t-butylperoxy)-3,3,5-trimethylcyclohexane.

Other Arbitrary Additional Components

The materials for forming the gasket of the present invention may further contain, in addition to the thixotropy imparting agent described above, a flaky inorganic additive, such as clay, diatom earth, talc, barium sulfate, calcium carbonate, magnesium carbonate, a metallic oxide, mica, graphite and aluminum hydroxide, a granular or powder solid filler, such as metallic powder, glass powder, ceramic powder and a granular or powder polymer, natural or artificial short fibers or long fibers (such as glass fibers, metallic fibers and polymer fibers), and the like.

Furthermore, a hollow filler, such as an inorganic hollow filler, e.g., glass balloons, and an organic hollow filler formed of polyvinylidene fluoride, a polyvinylidene fluoride copolymer or the like, may be mixed for reducing weight. A foaming agent may also be mixed for improving various properties, such as reduction in weight, and a gas may be mechanically entrained upon mixing.

Furthermore, depending on necessity, other additives may be used in combination, such as a photosensitizer, a thermal polymerization inhibitor, a curing accelerator, a flame retardant, an antibacterial agent, a hindered amine light stabilizer, an ultraviolet ray absorbent, an antioxidant, a colorant, a tackifier, such as a coumarone resin, a coumarone-indene resin, a phenol terpene resin, a petroleum hydrocarbon and a rosin derivative, an adhesive elastomer, such as Lheostomer B (a trade name, produced by Riken Vinyl Industry Co., Ltd.), a thermoplastic elastomer or resin, such as Hybrar (a trade name, a block copolymer containing a vinyl-polyisoprene block having connected at both ends thereof a polystyrene block, produced by Kuraray Co., Ltd.) and Norsorex (a trade name, polynorbornene obtained by ring-opening polymerization of norbornene, produced by Zeon Corporation).

Production Method of Multi-Stage Gasket

The multi-stage gasket of the present invention can be produced in the following manner.

The material for forming the gasket as the lowermost layer is extruded from an extrusion orifice of an automatic coating controlling apparatus to form an uncured gasket of the first stage, which is then semi-cured by irradiating with an energy ray or heating, and the material for forming the gasket as the uppermost layer is then extruded onto the gasket of the first stage (i.e., the lowermost layer) from an extrusion orifice of an automatic coating controlling apparatus to form an uncured gasket of the second stage, which is then wholly cured by irradiating with an energy ray or heating, thereby producing favorably a multi-stage gasket having two stages.

In the case where a multi-stage gasket having three or more stages is produced, a gasket of the first stage is formed with the lowermost layer gasket forming material and then semi-cured in the similar manner as above, and one stage of a gasket or plural stages of gaskets are formed by using an arbitrary material that has capability as a gasket and has contactness with the gaskets as the lowermost layer or higher as in the same manner as in the first stage. After semi-curing the gaskets depending on necessity, a gasket as the uppermost layer is formed with the uppermost layer gasket forming material, and then the gaskets are wholly cured, thereby producing a multi-stage gasket having three or more stages.

The semi-curing step that is performed after forming the uncured gasket as the first stage (i.e., the lowermost layer) is not an essential step, and such a method may be employed that an uncured gasket of the first stage is formed, on which uncured gaskets of the second stage or later are formed, and then the entire gaskets are wholly cured.

It is preferred on the other hand that the uncured gasket of the first stage is formed and then semi-cured since the gasket of the first stage is not collapsed upon forming the gaskets of the second stage or later to provide a multi-stage gasket having a large height. The gasket of the first stage may be preferably wholly cured from the standpoint of maintaining the shape thereof, but it is preferably semi-cured since the contactness between the gasket of the first stage and the gaskets of the second stage or later is enhanced by semi-curing. The semi-curing referred herein is such a state that crosslinking reaction partially proceeds with irradiation of an ultraviolet ray or the like or heat, in which crosslinked portions and uncrosslinked portions are present as admixture. Specifically, the semi-cured state can be obtained by controlling the exposure dose or the exposure time of an active energy ray, such as an ultraviolet ray, and by controlling the heating temperature and the heating time upon heat curing.

In the aforementioned production method, after forming the gasket of the first stage, an adhesive may be coated on the gasket, and then a gasket of the second stage or later may be formed. An adhesive may be applied between gaskets in the gaskets of the second stage or later. The application of an adhesive enhances the contactness between the gaskets of the respective stages in the gasket having a multi-stage structure of the present invention.

The adhesive is not particularly limited, and an active energy ray-curable resin may be preferably used, such as an epoxy acrylate resin, an epoxy resin and a urethane acrylate resin.

The apparatus used for extruding the gasket is not particularly limited as far as it is an apparatus that is capable of forming a gasket having a desired shape on a cover plate, and examples thereof include an air extrusion apparatus, a mechanical ram-press extrusion apparatus and a plunger extrusion apparatus. The nozzle shape is not particularly limited, and examples thereof include a circular shape, an elliptical shape and a polygonal shape. The inner diameter of the nozzle may be appropriately determined corresponding to the width of the gasket and is generally in a range of from 0.1 to 1.2 mm.

The extrusion pressure of the gasket forming material is appropriately determined depending on the kind, the viscosity and the like of the gasket forming material and is preferably from 50 kPa to 1 MPa. When the pressure is in the range, the gasket forming material can be efficiently extruded, and a gasket having a sufficiently narrow line width and a large height can be obtained without collapse of the uncured gasket. In view of the standpoint, the extrusion pressure of the gasket is more preferably from 80 to 800 kPa, further preferably from 100 to 800 kPa, and particularly preferably from 200 to 800 kPa.

The molding temperature of the gasket may be appropriately determined depending on the gasket material used and is preferably in a range of from 0 to 100° C., and more preferably in a range of from 30 to 70° C.

The viscosity of the gasket forming material is not particularly limited within a range where the gasket forming material can be coated, and in general, the viscosity at 50° C. is preferably in a range of from 50 to 1,000 Pa·s. In the case where the viscosity at 50° C. is in the range, an appropriate flowability can be obtained to shape the gasket.

The method for curing the uncured gasket may be a curing method by allowing to stand at ordinary temperature or heating or a curing method with an active energy ray, and the curing method with an active energy ray is preferred from the standpoint of attaining sufficient curing with high productivity. The active energy ray used for curing includes an ultraviolet ray, an electron beam, an $\alpha$-ray, a $\beta$-ray and a $\gamma$-ray, and in the present invention, an ultraviolet ray is particularly preferred among these. The uncured gasket can be favorably cured with an ultraviolet ray with a simple and convenient apparatus.

In the case where an ultraviolet ray is used, the gasket forming material preferably contains a photopolymerization initiator and/or a photosensitizer. In the case where an electron beam, a $\gamma$-ray or the like is used, curing can proceed rapidly without a photopolymerization initiator or a photosensitizer contained.

Examples of the ultraviolet ray source include a xenon lamp, a low pressure mercury lamp, a high pressure mercury lamp and an ultra-high pressure mercury lamp. The atmosphere where an ultraviolet ray is radiated is preferably an inert gas atmosphere, such as nitrogen gas or carbon dioxide gas, or an atmosphere where an oxygen concentration is reduced, and the material may be cured with an ultraviolet ray in an ordinary air atmosphere. The temperature of the irradiation atmosphere is generally from 10 to 200° C. The material may be baked after curing for removing volatile components. The baking temperature is preferably from 100 to 160° C.

Cover Plate

The cover plate, which is integrated with a gasket formed by extruding and curing the gasket forming material, may be formed with a metal or a synthetic resin, such as a thermoplastic resin. Examples of the metal for forming the cover plate include nickel-plated aluminum, nickel-plated steel, cold-rolled steel, zinc-plated steel, aluminum-zinc alloy-plated steel, stainless steel, aluminum, aluminum alloy, magnesium and magnesium alloy, which may be appropriately selected.

A product obtained by injection molding of magnesium may be used. A metal having been subjected to electroless nickel plating is preferred from the standpoint of corrosion resistance, and in the present invention, nickel-plated aluminum and nickel-plated steel are preferred.

The electroless nickel plating method may be a known method that has been ordinarily applied to a metallic material, for example, a method of immersing a metallic plate in an electroless nickel plating bath containing an aqueous solution containing nickel sulfate, sodium hypophosphite, lactic acid, propionic acid and the like in suitable ratios and having pH of approximately from 4.0 to 5.0 at a temperature of approximately from 85 to 95° C.

The multi-stage gasket of the present invention is preferred particularly in the case where a metallic body having been subjected to nickel plating or chromate treatment is used as the cover plate, and exhibits high adhesiveness at a high temperature condition, for example, approximately 85° C.

Examples of the thermoplastic resin for forming the cover plate include a styrene resin, such as an acrylonitrile-styrene (AS) resin, an acrylonitrile-butadiene-styrene (ABS) resin, polystyrene and syndiotactic polystyrene, an olefin resin, such as polyethylene, polypropylene and a polypropylene complex material, such as an ethylene-propylene copolymer, a polyamide resin, such as nylon, a polyester resin, such as polyethylene terephthalate and polybutylene terephthalate, modified polyphenylene ether, an acrylic resin, polyacetal, polycarbonate, a liquid crystal polymer and polyphenylene sulfide (PPS), which may be appropriately selected. As the liquid crystal polymer, a thermotropic liquid crystal polymer is preferred, and specific examples thereof include a polycarbonate liquid crystal polymer, a polyurethane liquid crystal polymer, a polyamide liquid crystal polymer and a polyester liquid crystal polymer. These resins may be used solely or in combination of two or more kinds of them.

In the case where the cover plate is formed of a synthetic resin, the cover body may be subjected to a surface treatment in advance for enhancing the adhesiveness to the gasket. Examples of the surface treatment include a plasma treatment and a corona discharge treatment. The plasma treatment may be performed by using an apparatus, such as a plasma radiation apparatus produced by Keyence Corporation.

The adhesiveness between the cover plate and the gasket can be enhanced by subjecting the cover plate to a primer treatment, such as coating an adhesiveness improving agent in the shape of the gasket, and then extruding the gasket forming material thereon.

EXAMPLE

The present invention is described in more detail with reference to the example below, but the present invention is not limited to the example.

The evaluation in Examples and Comparative Examples was performed in the following manner.

Reworkability of Cover Plate in HDD

A cover plate having a gasket formed thereon was assembled with a base plate, and allowing to stand at 85° C. for 24 hours, the cover plate was detached for confirming visually the presence of breakage and peeling of the gasket. The test was repeated five times, and the reworkability was finally confirmed.

Production Example 1

Production of Energy Ray-Curable Liquid Urethane Oligomer 400 g of a polyesterdiol compound (number average molecular weight: 2,000) obtained from 2,4-diethyl-1,5-pentanediol and phthalic anhydride, 82.4 g of norbornane diisocyanate and 0.10 g of 2,6-di-t-butyl-4-methylphenol as an antioxidant were placed in a 1 liter four-neck flask equipped with a stirrer, a condenser and a thermometer, and reacted at 80° C. for 2 hours. 46.2 g of 2-hydroxyethyl acrylate, 0.10 g of p-methoxyphenol as a polymerization inhibitor and 0.06 g of titanium tetra(2-ethyl-1-hexanoate) as an addition reaction catalyst were added thereto, and reacted at 85° C. for 6 hours. A part of the reaction solution was taken out, and the end point of the reaction was confirmed by disappearance of the absorption peak of an isocyanate group at 2,280 cm$^{-1}$ in the infrared absorption spectrum thereof, thereby providing a urethane oligomer. The number average molecular weight of the resulting urethane oligomer was measured with gel permeation chromatography and was 18,000 in terms of polystyrene conversion.

Example 1

(1) Preparation of Material for Forming Lowermost Layer Gasket 5 parts by mass of N-(acryloyl)morpholine (ACMO, a trade name, produced by Kohjin Corporation, Tg: 145° C.) was added to 100 parts by mass of the energy ray-curable liquid urethane oligomer produced in the Production Example 1, and additionally, 3.2 parts by mass of hydrogenated castor oil (ADVITROL 100, a trade name, produced by Sud-Chemie Catalysts Japan, Inc.) as a thickening agent, 0.75 part by mass of a toner (CMB-B1, a trade name, produced by Nippon Pigment Co., Ltd.), 1 part by mass of carbodiimide (a liquid carbodiimide compound, Elastostab H01, a trade name, produced by Nisshinbo Industries, Inc.) and 2 parts by mass of a photopolymerization initiator (Irgacure 2959, a trade name, produced by Ciba Speciality Chemicals, Inc.) were added thereto, thereby preparing a material for forming the lowermost layer gasket.

(2) Preparation of Material for Forming Uppermost Layer Gasket 5 parts by mass of a nonylphenyl ethyleneoxide-modified acrylate (n=1) (M-111, a trade name, produced by Toagosei Co., Ltd., structural formula: (IV-a), Tg: 17° C.) was added to 100 parts by mass of the energy ray-curable liquid urethane oligomer produced in the Production Example 1, and additionally, 3.2 parts by mass of hydrogenated castor oil (ADVITROL 100, a trade name, produced by Süd-Chemie Catalysts Japan, Inc.) as a thickening agent, 0.75 part by mass of a toner (CMB-B1, a trade name, produced by Nippon Pigment Co., Ltd.), 1 part by mass of carbodiimide (a liquid carbodiimide compound, Elastostab H01, a trade name, produced by Nisshinbo Industries, Inc.) and 2 parts by mass of a photopolymerization initiator (Irgacure 2959, a trade name, produced by Ciba Speciality Chemicals, Inc.) were added thereto, thereby preparing a material for forming the uppermost layer gasket.

(3) Production of Multi-Stage Gasket

An uncured gasket of the first stage was formed with the material for forming the lowermost layer gasket obtained in the item (1) on a nickel-plated aluminum plate (cover plate) having a thickness of 0.4 mm for 1.8-inch and 2.5-inch HDDs by using an automatic coating controlling apparatus, and was semi-cured by irradiating with an ultraviolet ray with an ultraviolet ray radiation apparatus. The ultraviolet ray irradiation was performed under the conditions of an illuminance of 100 mW/cm$^2$ and an accumulated light amount of 500 mJ/cm$^2$. An uncured gasket of the second stage was formed with the material for forming the uppermost layer gasket obtained in the item (2) on the semi-cured gasket of the first stage by using the same apparatus, and the gaskets were cured by irradiating with an ultraviolet ray with an ultraviolet ray radiating apparatus. The ultraviolet ray irradiation was performed under the conditions of an illuminance of 500 mW/cm$^2$ and an accumulated light amount of 2,000 mJ/cm$^2$. The resulting gasket had a ratio (h/w) of the height (h) and the width (w) of 1.1.

A dispenser machine was used as the automatic coating controlling apparatus. The apparatus was able to be used as a screw type or an air pressure type, and was used as an air pressure extrusion apparatus in the example. The extrusion orifice of the extrusion apparatus was exchangeable, and the extrusion orifice used for extrusion had a circular shape and a nozzle inner diameter of 0.72 mm.

The ultraviolet ray radiating apparatus used was UV1501BA-LT, produced by Sen Engineerings Co., Ltd.

The gasket having a two-stage structure thus produced was evaluated for reworkability of a HDD cover plate in the aforementioned manner. Upon detaching the cover plate from the base plate, the gasket suffered no breakage or peeling with less resistance and good workability, thereby providing sufficient reworkability.

Comparative Example 1

A multi-stage gasket was produced in the same manner as in Example 1 except that the gasket as the lowermost layer and the gasket as the uppermost layer were formed by using the material for forming the lowermost layer gasket in Example 1. As a result of the same evaluation as in Example 1, the gasket migrated to the base plate at a ratio of approximately 5% (5 samples among 100 samples tested).

Comparative Example 2

A multi-stage gasket was produced in the same manner as in Example 1 except that the gasket as the lowermost layer and the gasket as the uppermost layer were formed by using the material for forming the uppermost layer gasket in Example 1. As a result of the same evaluation as in Example 1, the gasket migrated to the base plate at a ratio of approximately 4% (4 samples among 100 samples tested).

INDUSTRIAL APPLICABILITY

The multi-stage gasket of the present invention is improved in reworkability of a cover plate and a base plate of a HDD, and is favorable as a gasket for a HDD, particularly a gasket for a small-sized HDD.

The invention claimed is:
1. A multi-stage gasket having a multi-stage structure constituted by multiple kinds of gasket materials and being used by holding between a cover plate and a base plate, the multi-stage gasket having contactness of a gasket as the lowermost layer to the cover plate or the base plate in contact with the gasket that is higher than contactness of a gasket as the uppermost layer to the cover plate or the base plate in contact with the gasket wherein the materials constituting the gaskets for stages constituting the multi-stage structure each contain a common base polymer, and the common base polymer is (A) an energy ray-curable liquid urethane oligomer having a polymerizable unsaturated group.

2. The multi-stage gasket according to claim 1, wherein the contactness of the gasket as the lowermost layer to the cover plate or the base plate is twice or more the contactness of the gasket as the uppermost layer to the cover plate or the base plate.

3. The multi-stage gasket according to claim 1, wherein the gasket as the lowermost layer is in contact closely to the cover plate, and the gasket as the uppermost layer is in contact closely to the base plate.

4. The multi-stage gasket according to claim 1, wherein the energy ray-curable liquid urethane oligomer having a polymerizable unsaturated group (A) is an unsaturated group-containing urethane oligomer having a number average molecular weight of from $5 \times 10^3$ to $5 \times 10^4$ represented by the following general formula (I):

$$R^1-O-CONH-R^2-NHCO-(-O-R^3-O-CONH-R^2-NHCO)_p-(-A^1-CONH-R^2-NHCO-)_q-(-O-R^3-O-CONH-R^2-NHCO-)_r-O-R^1 \quad (I)$$

wherein $R^1$ represents a dehydroxylated residual group of a monool compound containing at least one unsaturated group selected from a (meth)acryloyl group and a vinyl group; $R^2$ represents a deisocyanated residual group of an organic diisocyanate compound; $R^3$ represents a dehydroxylated residual group of a polyesterdiol compound having a number average molecular weight of from $1 \times 10^3$ to $1 \times 10^4$ containing a cyclic group or a branched chain group; $A^1$ represents a dehydrogenated residual group of a diamine compound or a dehydrogenated residual group of a diol compound; p and r each is from 0 to 7, and q is from 0 to 3, provided that when q=0, $1 \leq p+r \leq 10$.

5. The multi-stage gasket according to claim 4, wherein the material for forming the gasket as the lowermost layer contains (B) a (meth)acrylic monomer having a nitrogen-containing heterocyclic structure represented by the following general formula (II):

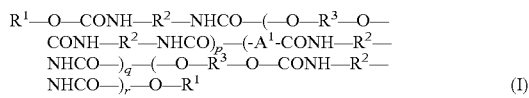

wherein $R^4$ represents a hydrogen atom or a methyl group; and $R^5$ represents a group having a nitrogen-containing heterocyclic structure, and the material for forming the gasket as the uppermost layer contains (C) a monofunctional (meth) acrylic monomer, a cured product of which has a glass transition temperature (Tg) of from −70 to 20° C.

6. The multi-stage gasket according to claim 5, wherein the monofunctional (meth)acrylic monomer, a cured product of which has a glass transition temperature (Tg) of from =70 to 20° C. (C) is a (meth)acrylate ester compound represented by the following general formula (III):

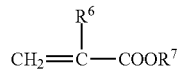

wherein $R^6$ represents a hydrogen atom or a methyl group; and $R^7$ represents an alkyl group having from 8 to 20 carbon atoms.

7. The multi-stage gasket according to claim 5, wherein the monofunctional (meth)acrylic monomer, a cured product of which has a glass transition temperature (Tg) of from −70 to 20° C., (C) is a (meth)acrylate ester compound represented by the following general formula (IV):

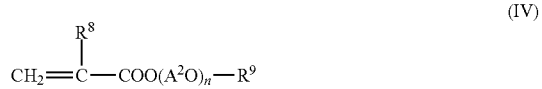

wherein $A^2$ represents an alkylene group having from 2 to 4 carbon atoms; $R^8$ represents a hydrogen atom or a methyl group; $R^9$ represents an alkyl group having from 6 to 20 carbon atoms, an aralkyl group having from 7 to 20 carbon atoms or an aryl group having from 6 to 20 carbon atoms; and n represents a number of from 1 to 7 in average.

8. The multi-stage gasket according to claim 1, wherein the gaskets for stages having the multi-stage structure are in contact closely to each other through an adhesive.

9. The multi-stage gasket according to claim 1, wherein the material for forming the gasket as the lowermost layer is extruded from an extrusion orifice of an automatic coating controlling apparatus to form the gasket as the lowermost layer, then the material for forming the gasket as the uppermost layer is extruded onto the gasket as the lowermost layer, and then they are cured by irradiating with an ionizing radiation.

10. The multi-stage gasket according to claim 9, wherein the material for forming the gasket as the lowermost layer is extruded from an extrusion orifice of an automatic coating controlling apparatus and is then semi-cured.

11. The multi-stage gasket according to claim 1, which is for a hard disk device.

12. A multi-stage gasket having a multi-stage structure constituted by multiple kinds of gasket materials and being used by holding between a cover plate and a base plate, the multi-stage gasket having contactness of a gasket as the lowermost layer to the cover plate or the base plate in contact with the gasket that is higher than contactness of a gasket as the uppermost layer to the cover plate or the base plate in contact with the gasket, wherein the materials constituting the gaskets for stages constituting the multi-stage structure each contain a common base polymer, and the common base polymer is selected from the group comprising an epoxy polymer, polyisoprene, hydrogenated polyisoprene, polybutadiene, hydrogenated polybutadiene, polyisobutylene, and modified products thereof.

13. The multi-stage gasket according to claim 12, wherein the contactness of the gasket as the lowermost layer to the cover plate or the base plate is twice or more the contactness of the gasket as the uppermost layer to the cover plate or the base plate.

14. The multi-stage gasket according to claim 12, wherein the gasket as the lowermost layer is in contact closely to the cover plate, and the gasket as the uppermost layer is in contact closely to the base plate.

15. The multi-stage gasket according to claim 12, wherein the gaskets for stages having the multi-stage structure are in contact closely to each other through an adhesive.

16. The multi-stage gasket according to claim 12, wherein the material for forming the gasket as the lowermost layer is extruded from an extrusion orifice of an automatic coating controlling apparatus to form the gasket as the lowermost layer, then the material for forming the gasket as the uppermost layer is extruded onto the gasket as the lowermost layer, and then they are cured by irradiating with an ionizing radiation.

17. The multi-stage gasket according to claim 16, wherein the material for forming the gasket as the lowermost layer is extruded from an extrusion orifice of an automatic coating controlling apparatus and is then semi-cured.

18. The multi-stage gasket according to claim 12, which is for a hard disk device.

* * * * *